United States Patent [19]

Margulies

[11] 4,306,369
[45] Dec. 22, 1981

[54] ANIMAL TRAPS
[75] Inventor: Herman Margulies, South Orange, N.J.
[73] Assignee: Sterling Drug Inc., New York, N.Y.
[21] Appl. No.: 118,676
[22] Filed: Feb. 5, 1980
[51] Int. Cl.³ .......................................... A01M 23/30
[52] U.S. Cl. ...................................................... 43/81
[58] Field of Search .......................................... 43/81
[56] References Cited
U.S. PATENT DOCUMENTS

| | | | |
|---|---|---|---|
| 528,671 | 11/1894 | Hooker | 43/81 |
| 615,218 | 11/1898 | Hotchkiss | 43/81 |
| 954,045 | 4/1910 | Pearsall | 43/81 |
| 1,345,137 | 6/1920 | Cowel | 43/81 |
| 2,188,696 | 1/1940 | Woodroffe | 43/81 |
| 2,598,205 | 5/1952 | Altham | 43/81 |
| 4,245,423 | 1/1981 | Souza et al. | |

FOREIGN PATENT DOCUMENTS 2034845  1/1972  Fed. Rep. of Germany .......... 43/81

*Primary Examiner*—Stephen G. Kunin
*Assistant Examiner*—J. T. Zatarga
*Attorney, Agent, or Firm*—Wenderoth, Lind & Ponack

[57] ABSTRACT

Readily assembled animal trap comprising a one-piece spring-actuated jaw/torsion spring and a one-piece molded plastic base with projections for receiving the jaw/spring unit.

12 Claims, 7 Drawing Figures

ANIMAL TRAPS

BACKGROUND OF THE INVENTION

The present invention relates to animal traps and, in particular, rodent traps having a spring-actuated jaw which descends upon the animal when the animal contacts a baited trigger or release mechanism for said jaw.

Such traps are in such common usage that few notable improvements have been made in almost a century.

Conventional traps of the above-described type are generally satisfactory in operation but are tedious to assemble, because generally they consist of a number of separate parts, including a base (usually wooden), a spring-actuated jaw (usually in two parts, i.e. the jaw and a spring), a hold-down bar for the jaw and a baited trigger which secures the bar holding the jaw and then releases it when the trigger is disturbed. Staples or the like are conventionally used to fasten the various components to the base.

In a preferred embodiment, the traps provided by the present invention consist of only two parts, a one-piece base having all essential elements necessary for mounting thereon a one-piece combination torsion spring and striker bar. Accordingly, it is an object of this invention to provide a trap which may be readily assembled.

It is a further object of this invention to provide a method for such ready assembly.

THE PRIOR ART

There are several references in the patent literature that appear to suggest the use of one-piece coil torsion spring/striker bar units in rodent traps or from whose drawings such one-piece construction might be inferred. However, in all such cases the spring/striker bar units are fixed to the trap base by use of staples, screw eyes, mandrels and the like, and assembly of the trap is thus complicated if not difficult.

Thus Hotchkiss, U.S. Pat. No. 615,218 shows a one-piece spring/striker jaw, but the spring is mounted on the trap base by a mandrel axially oriented to the coil spring, passing through the center thereof, and attached to the base by means of one end being bent at a right angle and driven into the base, the other end being secured by a staple or screw eye.

The drawings of Cowel, U.S. Pat. No. 1,345,137, Woodroffe, U.S. Pat. No. 2,188,696 and Altham, U.S. Pat. No. 2,598,205 appear to show a one piece coil spring/striker bar arrangement, but the precise structure of these spring/bar parts is not clear either from the drawings or from the descriptions in the specifications. The spring/bar units in these latter three patents are either attached to the base by means of the ends of the spring/bar wire being bent at right angles and driven into the base (Cowel) or by staples (Woodroffe and Altham), and in all three cases the traps are composed of numerous separate parts thus making assembly of the traps lengthy and difficult.

Pearsall U.S. Pat. No. 954,045 shows an animal trap having an extended base section at one end which could function as a safety area. The concept involved in the Pearsall patent however is directed to eliminating the base portion of the trap which would normally underlie the striker jaw in its sprung position. This arrangement solves the problem of the traps becoming scented by the smells of animals that have been trapped and which would otherwise cause subsequent animals to avoid the trap. The extension of the base at the end of the trap opposite the spring striker jaw thus serves only to provide a stable base which would otherwise be lost as a result of the elimination of the base portion under the striker jaw.

SUMMARY OF THE INVENTION

The above-identified objects, and other objects, are achieved by the present invention wherein a trap is produced from a one-piece spring-actuated jaw and a thermoformed or molded plastic base having projections for receiving said jaw molded into the base. A hold-down bar means for holding said jaw in a high tension position and a feed plate (baited trigger) capable of releasing said bar when disturbed may also be moulded into the base or may be attached by means of staples, screws, etc.

DETAILED DESCRIPTION

Figure 1:
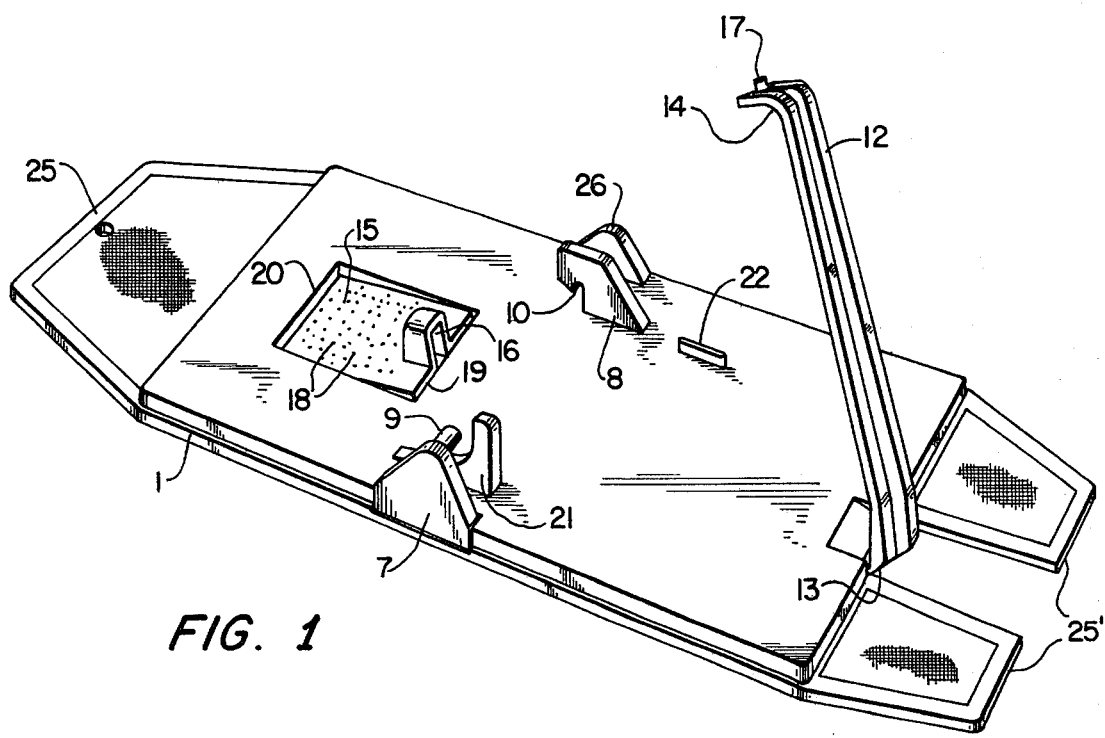
FIG. 1 is a perspective view of the base of the present invention.
Figure 2:
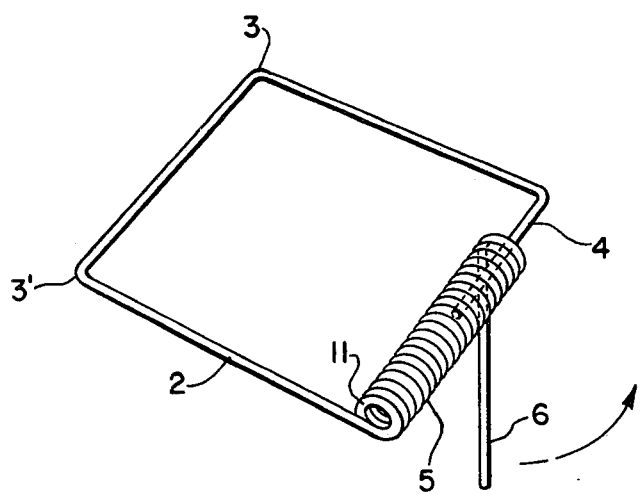
FIG. 2 is a perspective view of the one-piece spring-actuated jaw of the present invention before mounting on the base.
Figure 3:
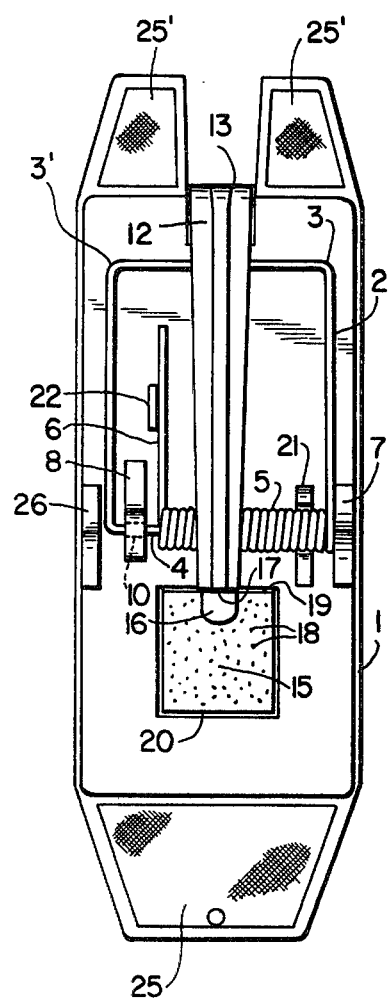
FIG. 3 is a top plan view of the trap of the present invention in the set position.

With reference to FIGS. 1 to 3, where like numerals designate like parts, there is provided base (1) made of plastic material such as polyvinyl chloride, polyethylene or other moldable thermoplastic material.

On base (1) is mounted spring-actuated striker jaw (2) which consists of a single wire bent into a U-shape with right angles (3) and (3'). Across the mouth of the U-shape is a straight portion (4) and a coil spring portion (5). The straight portion (4) is the initial portion of the wire, and the terminal portion of the wire (6) is also straight and extends from the end of said coil spring generally normal to the axes of the coil spring (5) and straight portion (4).

At about the mid-portion of base (1) and towards or at opposite sides thereof are provided two vertical projections (7) and (8) integral with said base. Towards the top of the first vertical projection (7) is a horizontal, peg-like projection (9) which peg-like projection extends towards the second vertical projection (8).

Vertical projection (8) provides an arch (10) under which the straight portion (4) of the spring-actuated jaw is engaged.

Spring-actuated jaw (2) is mounted on base (1) by forcing terminal wire portion (6) parallel to the plane of said jaw but outside the area enclosed by said jaw, i.e. in the direction of the arrow in FIG. 2. While terminal portion (6) may initially be parallel to the plane of the U-shaped jaw, it is preferred that when not under tension (prior to mounting), terminal portion (6) be outside said plane.

Then the end portion (11) of said coil is placed over horizontal projection (9), and straight wire portion (4) is urged under arch portion (10) of the second vertical projection (8). The spring-actuated jaw is then under relatively low or no tension. In this manner the spring-actuated jaw (2) is pivotally mounted on base (1).

Figure 6A:
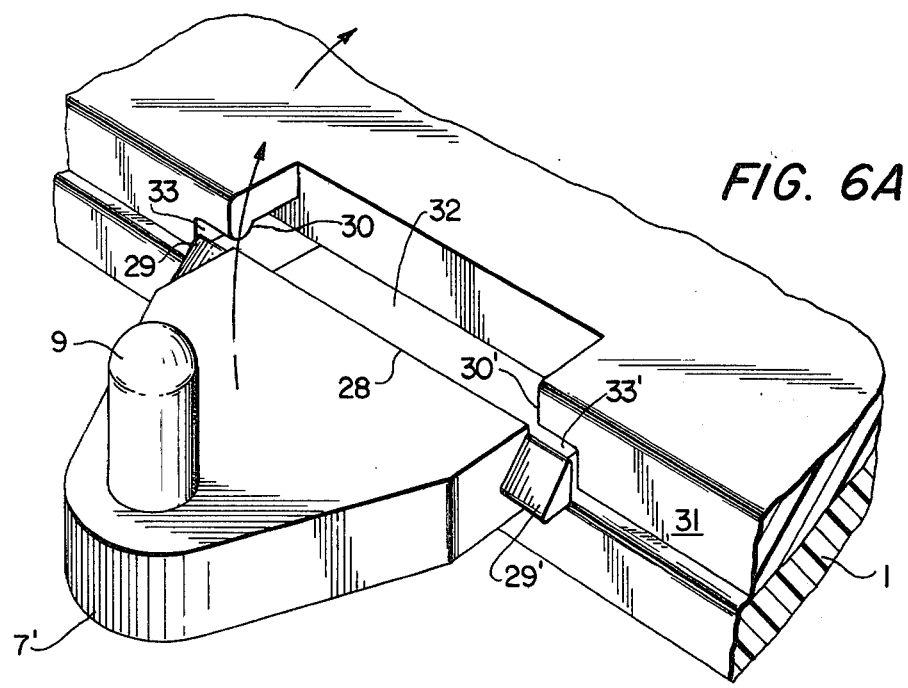
FIGS. 6A and 6B are perspective views of a base embodiment of the present invention.
Figure 6B:
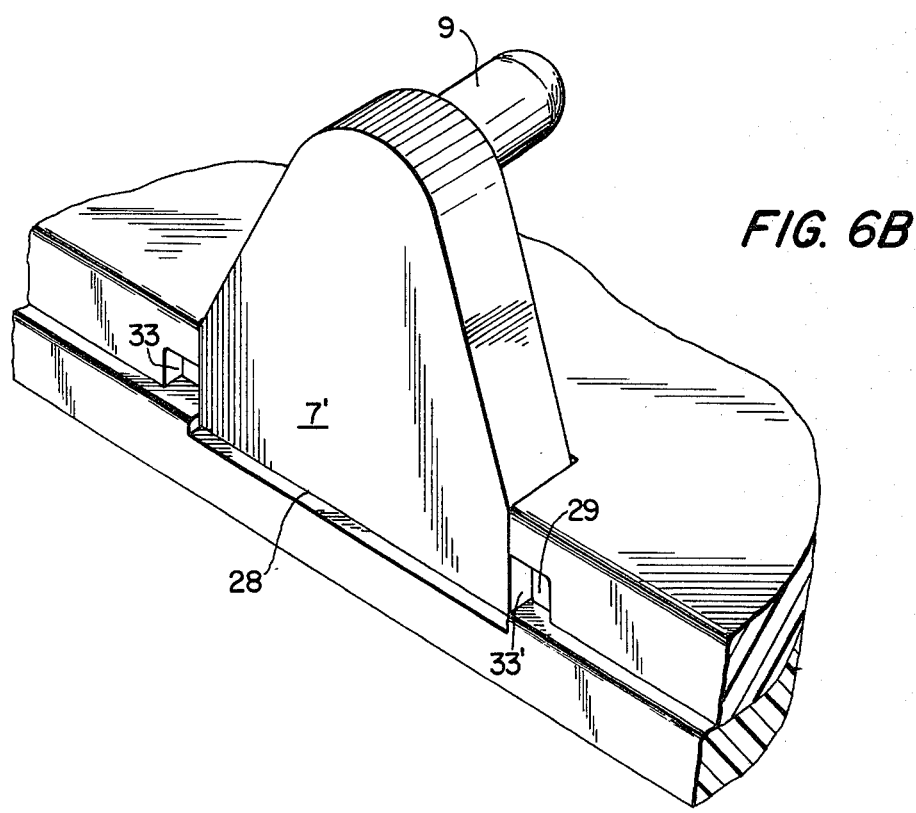

In an alternative embodiment, shown in FIGS. 6A and 6B, a first vertical projection (7') having a unitary horizontal projection (9) attached thereto can be swingably mounted on base (1) by a live hinge (28) which is located on the underside of first vertical projection (7'). The live hinge (28) thus permits deflection of the first vertical projection either outward from its usual position perpendicular to the plane of the base as shown in FIG. 6A or return thereto by deflection in the opposite direction as shown in FIG. 6B.

Projection (7') snugly nests in base (1) as follows. On side wall (31) of base (1), there is provided recess (32) which is large enough to accommodate the lower portion of vertical projection (7') in its normal position, perpendicular to the plane of the base. Projection (7') is retained in recess (32) in a positive manner as follows. Lugs (29) and (29') horizontally protrude from the bottom of the lower side portion of projection (7') and these lugs snugly nest in slots (33) and (33') which slots are recesses in base (1) adjacent to recess (32). The forward portions of the top surface of slots (33) and (33') are defined by downwardly protruding projections (30) and (30'), and the top surface of lugs (29) and (29') snappingly engage the bottom surface of said projections (30) and (30') to hold projection (7') firmly in vertical position, i.e. perpendicular to the plane of base (1), and yet permit projection (7') to swing outwardly and inwardly for ready disassembly or assembly of the trap.

Assembly of a trap employing this embodiment comprises forcing the terminal wire portion (6) parallel to the plane of the striker jaw but outside the area enclosed thereby; urging the first vertical projection (7') outwardly and out of perpendicular with the plane of the base (1); placing the straight wire portion (4) under arch portion (10) of the second vertical projection (8); and returning the first vertical projection (7') to a position perpendicular to the plane of the base (1) while inserting horizontal projection (9) into the end portion (11) of the coil.

When the spring-actuated jaw (2) is swung 180° from a relatively low tension position into a relatively high tension position, it is held in such high tension position by a holddown means, e.g. bar (12) which is pivotally mounted at or near the rear of base (1). The mounting of bar (12) on base (1) is preferably via a live hinge portion (13), whereby the bar and its hinge are an integral and unitary extension of the base assembly, i.e. the bar and its hinge are molded into the base as an integral part thereof.

The bar (12) desirably has a downwardly curved or J-shaped portion (14) which constitutes the terminal or free end thereof and is adapted to fit over the top of coil (5).

Bar (12) is held in place by interaction with feed plate (15) as follows. Feed plate (15) is also pivotally mounted on base (1) preferably via a live hinge (19). The feed plate is thus able to pivot through the plane of the base. The feed plate has a recess (16) therein in proximity to its pivotal mounting point and is engagable with a protrusion (17) on the free end of J-shaped portion (14) of bar (12). It is thereby possible to lock spring-actuated striker jaw (2) in place under hold-down bar (12) while the striker jaw is maintained under relatively high tension.

When locked in position, the feed plate is desirably on a diagonal to the plane of the base with the hinged portion (19) being below the opposite edge (20) of said feed plate.

The feed plate (15) may have indentations (18) or any other suitable means for holding bait.

When the animal contacts the feed plate, the plate is urged from the diagonal towards the plane of the base, releasing bar (12) which in turn releases spring-actuated striker jaw (2) which descends on and traps the animal.

In a preferred embodiment, the base may have a cradle (21) molded thereon, which is shaped to fit the bottom surface of the coil, in order to thereby limit its horizontal movement.

In another preferred embodiment, there is provided a lug (22) which limits the movement of the terminal straight portion (6) of the spring-actuated jaw.

A third vertical projection (26) may also be provided to limit lateral movement of the spring.

Both the hold-down bar (12) and feed plate (15) may be affixed to the base by conventional means such as screws, staples, adhesives, etc. However, the provision of live hinges joining each of these parts to the base permits the base to be formed as a unitary article.

Figure 5:
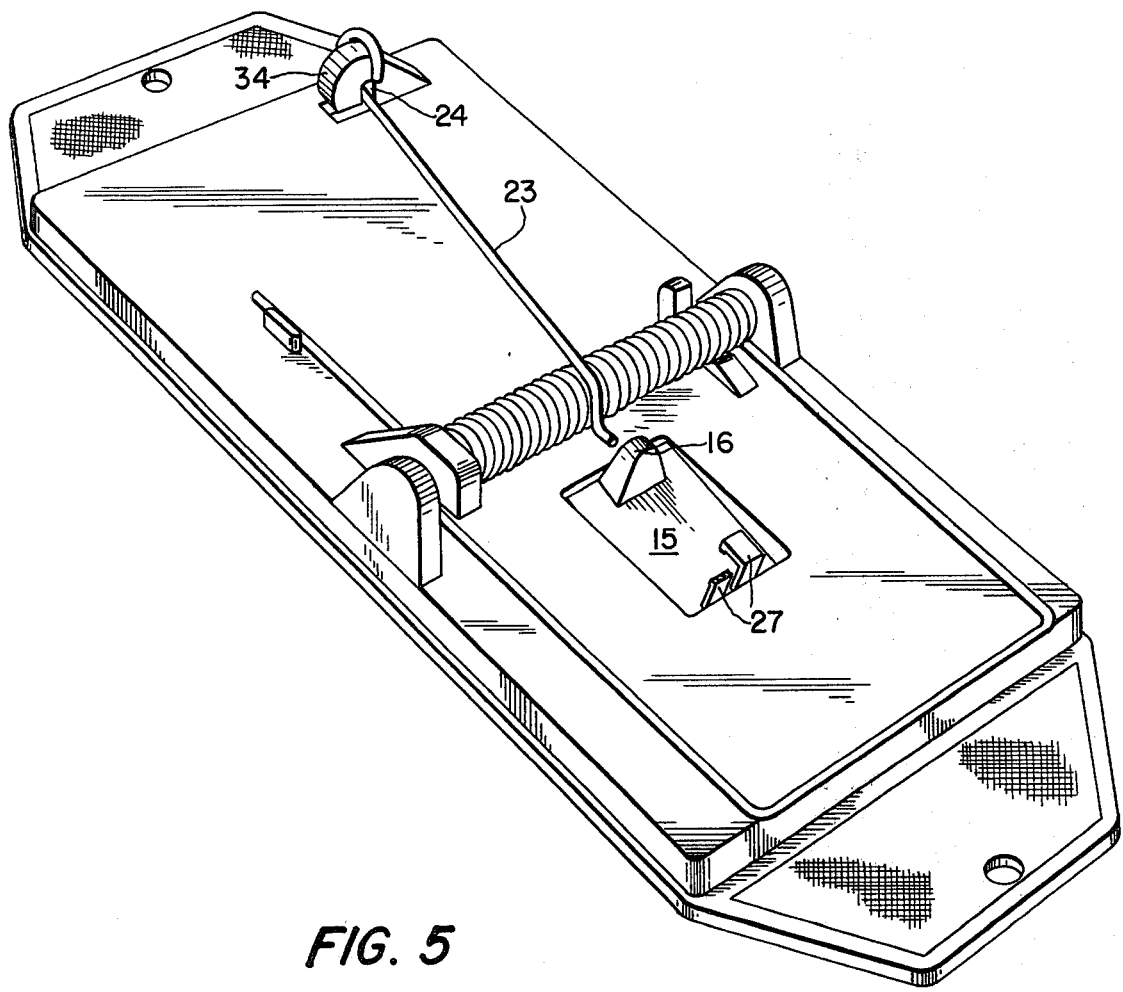
FIG. 5 is a perspective view of a further base embodiment of the present invention.

As shown in FIG. 5, the hold-down bar may alternatively be formed of wire (23) attached to base (1) by a loop (24) formed in one end of wire (23) which is pivotally attached to base (1) by closure of the loop through lug 34, which is molded into the base, said wire being engagable with recess (16) of feed plate (15). In this embodiment, it is desirable to have the bar set on the diagonal in order to minimize the possibility of premature release.

Feed plate (15) of FIG. 5 may be provided with hook-like projections (27) for holding bait.

Figure 4:
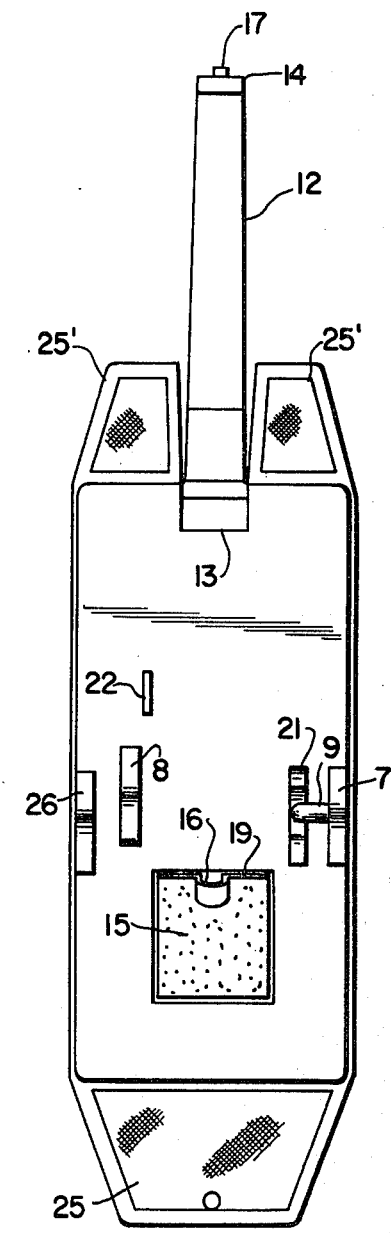
FIG. 4 is a top plan view of the base of FIG. 3.

Base (1) is also desirably provided with safety areas or extensions (25), (25') shown in FIGS. 1, 3 and 4 which facilitate grasping base (1) while either setting the striker jaw (2) or assembling the trap.

As a result of the provisions of the foregoing specific base and spring-actuated jaw, the assembly of the trap is greatly simplified as described above.

It is apparent that numerous modifications of the foregoing embodiments may be made without departing from the inventive concept.

I claim:

1. An animal trap comprising a substantially rectangular base of thermoformed plastic having at least two vertical projections at about the mid-portion thereof and integral with said base;

a one-piece spring-actuated striker jaw mounted on said base which consists of a wire bent into a right angle U-shape with a straight portion and a coil spring across the mouth of the U-shape, the terminal portion of said wire extending from the end of said spring, said terminal portion being straight and generally normal to the axes of said coil spring and said straight portion;

the first of said vertical projections on said base having a horizontal projection on the upper portion thereof extending toward the second vertical projection and projecting into the end portion of said coil spring, the second of said vertical projections having an arch portion thereon under which said straight portion of said wire is engaged, the terminal portion of said wire being forced parallel to the plane of said striker jaw when said coil spring is held by said horizontal projection and said second vertical projection, with said coil spring being urged against said arch portion and said horizontal projection under relatively low or no tension;

a hold-down bar means pivotally mounted on said base for holding down said jaw when said jaw is swung 180° from said low or no tension position into a relatively high tension position, said bar having a projection on the free end portion thereof;

and a feed plate, pivotally mounted on and movable through the plane of said base, said feed plate having a recess therein in proximity to the pivotal mounting point in which said bar projection is engagable to lock said spring-actuated striker jaw in place under relatively high tension, said feed plate having means thereon for affixing an animal bait material thereto.

2. The trap according to claim 1 wherein said first vertical projection is swingably mounted on said base by a live hinge molded thereon.

3. The trap according to claim 1 wherein either the said hold-down bar means or the said feed plate or both are integral with said base and are affixed thereto by a live hinge molded thereon.

4. The trap according to claim 1 wherein said hold-down means is J-shaped and is adapted to fit over the top of the coil of said coil spring.

5. The trap according to claim 1 wherein said base has a lug adjacent to the terminal portion of said wire to limit the movement thereof.

6. The trap according to claim 4 wherein the plane of said feed plate is diagonal with respect to the plane of said base when the recess of said plate is engaged with said bar.

7. The trap according to claim 1 wherein said base further has extensions at each end thereof for enabling the user to grasp the base to facilitate setting the trap with the fingers out of the path of movement of the striker jaw.

8. The trap according to claim 1 wherein said base is provided with a cradle adjacent said first vertical projection bearing said horizontal projection, which cradle is shaped to fit the bottom surface of said coiled spring in order to thereby limit its horizontal movement.

9. The trap according to claim 1 wherein said first vertical projection is swingably mounted on said base by a live hinge connecting the bottom portion of said vertical projection and said base, said base having a recess in the side wall thereof to permit the lower portion of said vertical projection to nest therein.

10. The trap according to claim 19 wherein said first vertical projection is held in said recess by providing two horizontally protruding lugs from the bottom of the side portion of said vertical projection, said lugs nesting in two slots adjacent to said recess, the forward portion of the top surface of said slots being defined by two downwardly protruding projections which snappingly engage said lugs when said first vertical projection is swung from a position parallel to the plane of said base to a position perpendicular to the plane of said base.

11. A method of assembling an animal trap comprising a substantially rectangular base of thermoformed plastic having at least two vertical projections at about the midportion thereof and integral with said base;

a one-piece spring-actuated striker jaw mounted on said base which consists of a wire bent into a right angle U-shape with a straight portion and a coil spring across the mouth of the U-shape, the terminal portion of said wire extending from the end of said spring, said terminal portion being straight and generally normal to the axes of said coil spring and said straight portion;

the first of said vertical projections on said base having a horizontal projection on the upper portion thereof extending toward the second vertical projections and projecting into the end portion of said coil spring, the second of said vertical projections having an arch portion thereof under which said straight portion of said wire is engaged, the terminal portion of said wire being forced parallel to the plane of said striker jaw when said coil spring is held by said horizontal projection and said second vertical projection with said coil spring being urged against said arch portion and said horizontal projection under relatively low or no tension;

a hold-down bar means pivotally mounted on said base for holding down said jaw when said jaw is swung 180° from said low or no tension position into a relatively high tension position, said bar having a projection on the free end portion thereof;

and a feed plate, pivotally mounted on and movable through the plane of said base, said feed plate having a recess therein in proximity to the pivotal mounting point in which said bar projection is engagable to lock said spring-actuated striker jaw in place under relatively high tension, said feed plate having means thereon for affixing an animal bait material thereto, which method comprises the steps of forcing the terminal portion of said wire parallel to the plane of said jaw, placing the end portion of said coil spring over said horizontal projection on said first vertical projection and engaging the straight portion of said wire with said arch portion of said second vertical projection by maneuvering said straight portion under the arch of said second vertical projection.

12. A method of assembling an animal trap comprising a substantially rectangular base of thermoformed plastic having at least two vertical projections at about the mid-portion thereof and integral with said base;

a one-piece spring-actuated striker jaw mounted on said base constituted by a wire bent into a right angle U-shape with a straight portion and a coil spring across the mouth of the U-shape, the terminal portion of said wire extending from the end of said spring, said terminal portion being straight and generally normal to the axes of said coil spring and said straight portion;

the first of said vertical projections on said base being swingably mounted thereon by a live hinge permitting deflection of said first vertical projection outward from its position perpendicular to the plane of said base, and having a horizontal projection on the upper portion thereof extending toward the second vertical projection and projecting into the end portion of said coil spring when said first vertical projection is perpendicular to the plane of said base, the second of said vertical projections having an arch portion thereon under which said straight portion of said wire is engaged, the terminal portion of said wire being forced parallel to the plane of said striker jaw when said coil spring is held by said horizontal and said second vertical projections with said coil spring being urged against said arch portion and said horizontal projection under relatively low or no tension;

a hold-down bar means pivotally mounted on said base for holding down said jaw when said jaw is swung 180° from said low or no tension position into a relatively high tension position, said bar having a projection on the free end portion thereof;

and a feed plate, pivotally mounted on and movable through the plane of said base, said feed plate having a recess therein in proximity to the pivotal mounting point in which said bar projection is engagable to lock said spring-actuated striker jaw in place under relatively high tension, said feed plate having means thereon for affixing an animal bait material thereto, which method comprises the steps of forcing the terminal portion of said wire parallel to the plane of said jaw, urging said first vertical projection outwardly and out of perpendicular with said base, placing the said straight wire portion under said arch portion of said second vertical projection, and returning the said first vertical projection to a position perpendicular to the plane of said base while inserting said horizontal projection into the said end portion of said coil.

* * * * *

UNITED STATES PATENT AND TRADEMARK OFFICE
CERTIFICATE OF CORRECTION

PATENT NO. : 4,306,369
DATED : December 22, 1981
INVENTOR(S) : Herman Margulies

It is certified that error appears in the above—identified patent and that said Letters Patent is hereby corrected as shown below:

Column 5, Claim 10, line 1, change "19" to -- 9 --.

Signed and Sealed this

Eleventh Day of January 1983

[SEAL]

Attest:

GERALD J. MOSSINGHOFF

Attesting Officer — Commissioner of Patents and Trademarks